Aug. 29, 1933.  E. R. BERLUTI  1,924,302
ROTATABLE CONNECTER
Filed June 9, 1930  2 Sheets-Sheet 2
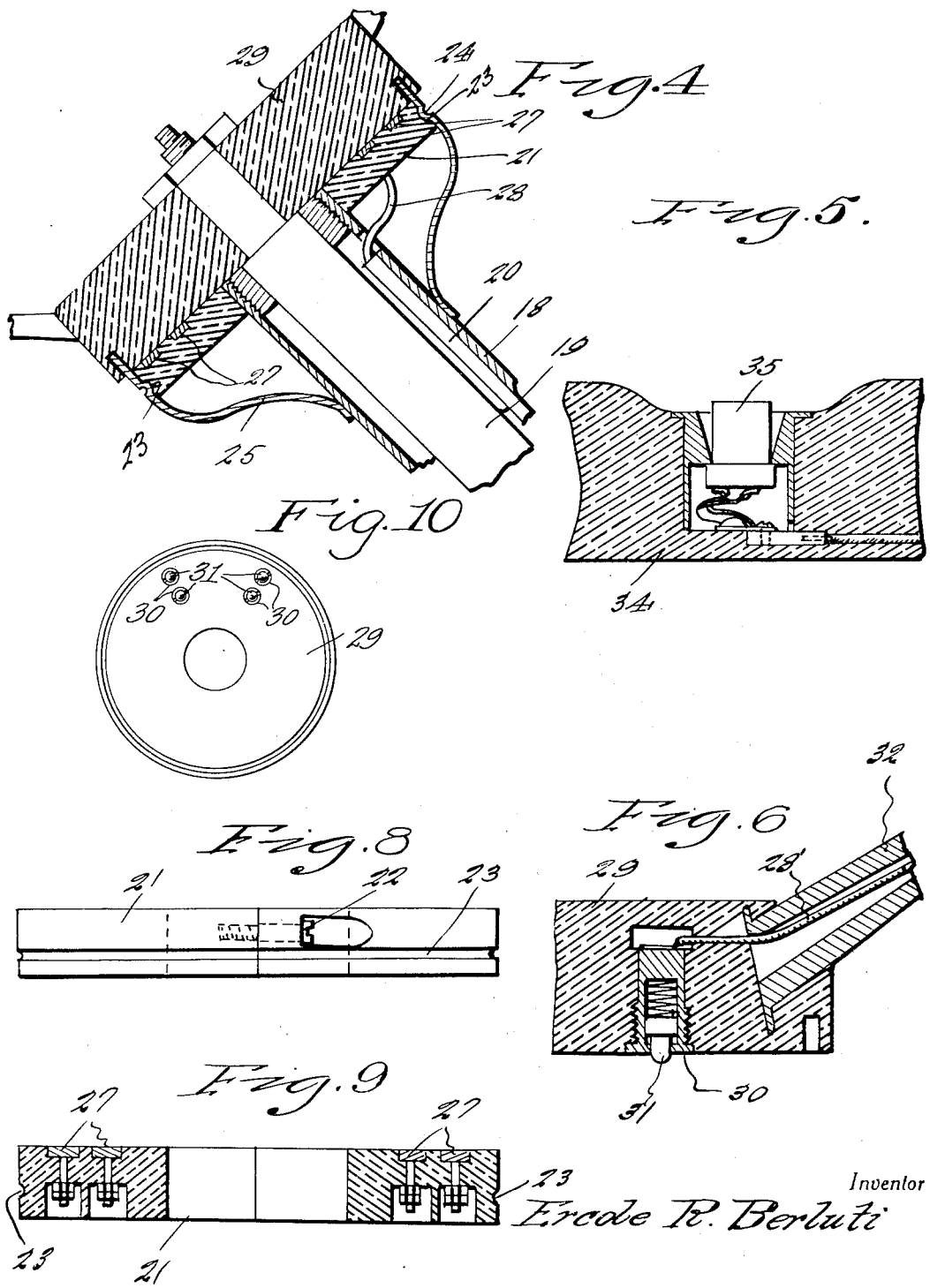

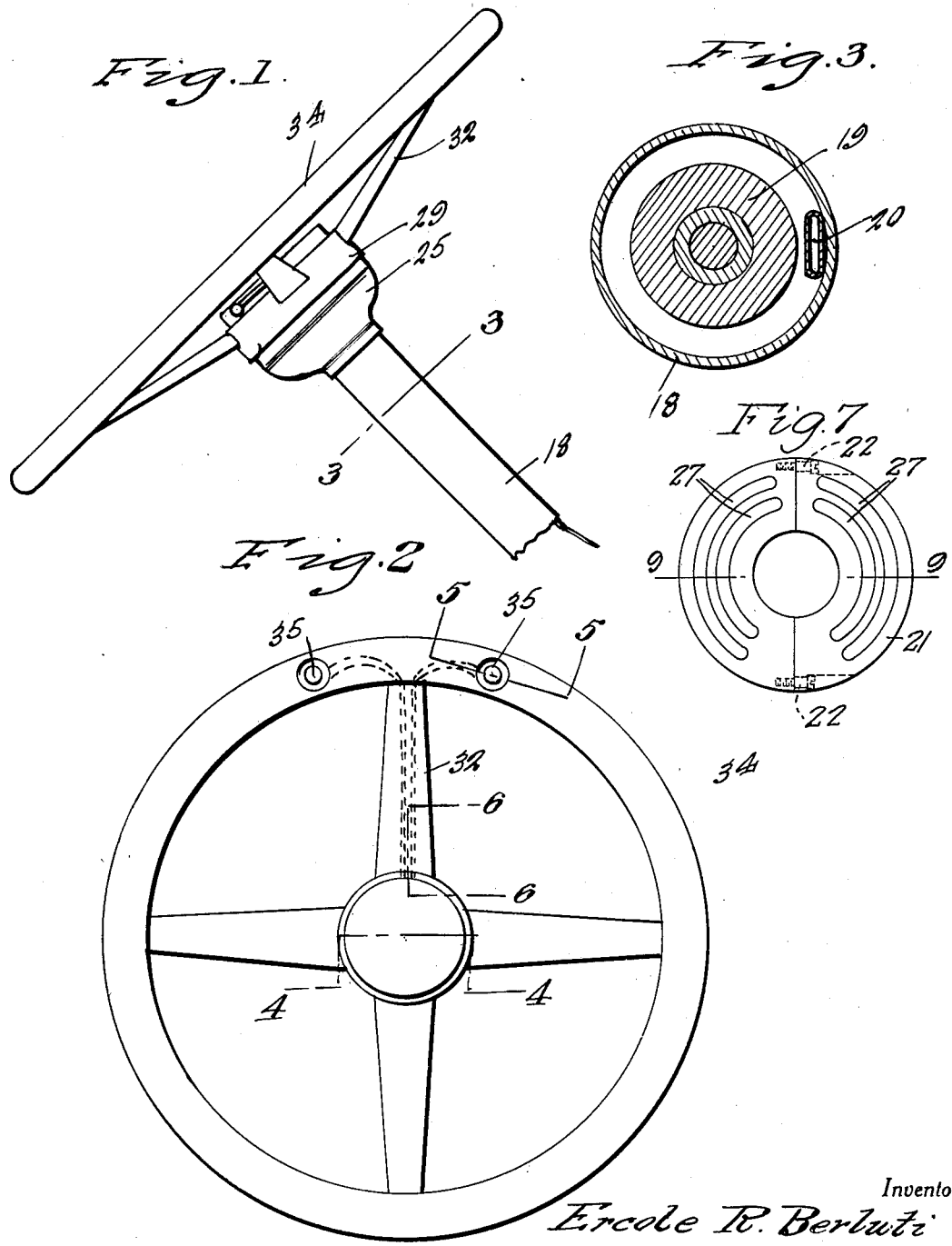

Patented Aug. 29, 1933

1,924,302

UNITED STATES PATENT OFFICE 1,924,302

ROTATABLE CONNECTER

Ercole R. Berluti, Saginaw, Mich.

Application June 9, 1930. Serial No. 459,969

1 Claim. (Cl. 173—324)

The present invention relates to an automobile direction signal system and has for its prime object to provide a signal system which is controllable from the steering wheel in a convenient manner for indicating right and left hand turns so as to insure greater safety in traffic with greater ease and accuracy of signalling on the part of the operator.

Another very important object of the invention resides in the provision of a novel steering wheel structure for controlling the circuit incident to the signal.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a steering wheel embodying the features of my invention, Figure 2 is a top plan view thereof, Figure 3 is a section taken substantially on the line 3—3 of Figure 1, Figure 4 is a section taken substantially on the line 4—4 of Figure 2, Figure 5 is a section taken substantially on the line 5—5 of Figure 2, Figure 6 is a section taken substantially on the line 6—6 of Figure 2, Figure 7 is a top plan view of the sectional disk, Figure 8 is an edge elevation thereof, Figure 9 is a sectional view therethrough taken substantially on the line 9—9 of Figure 7, and Figure 10 is a bottom plan view of the hub of the steering wheel.

In these drawings, the numeral 18 denotes a steering column with a steering shaft 19 mounted therein in the usual well known manner. A flat like tube 20 is mounted in the steering column to house the wiring leading from the signal lamps. A sectional disk 21 of insulating material is clamped on the upper end of the steering column, the sections being held together by screws 22 and the periphery of the disk being provided with an annular groove 23 which receives a bead 24 of a casing like annular member 25 about the steering column. In each section of the disk 21 in the upper surface thereof is a pair of concentric arcuate conductor strips 27 with which wiring 28 is connected.

The numeral 29 denotes the hub of a steering wheel and is formed of insulating material. Plugs 30 are mounted in the hub 29 and are hollow and house spring pressed brushes 31 to wipe against the conductor strips 27 and wiring 28' leads from these brushes through hollow spokes 32 on the hub to the rim 34 in which are two push button switches 35.

The right hand switch button 35, of course, controls the right hand signal light while the left hand switch button controls the left hand signal light. In order to exemplify the operation of the signal apparatus it will be understood that if a right hand turn is to be made the operator places his finger or thumb on the right hand switch button 35 thereby lighting the right hand light or lights as the case may be. They remain lighted even as the steering wheel is turned to guide the machine around the corner because of the connection provided by the brushes and the arcuate strips heretofore referred to.

It is thought that the construction, operation, utility and advantages of this invention will now be quite apparent to those skilled in this art without a more detailed description thereof.

The present embodiment of the invention has been described in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a vehicle signalling system, and in combination with a steering column and a steering wheel having its hub formed of non-conducting material, a sectional disk of non-conducting material, having a groove in its periphery, a casing connected with the column and having an internal rib thereon engaging the groove, said disk having an opening therein, the walls of which engage the upper end of the column with the upper face of the disk contacting the lower face of the hub, contact strips in the upper face of the disk and brushes carried by the hub of the steering wheel for engaging said contact strips.

ERCOLE R. BERLUTI.